United States Patent [19]

Pagliaccio

[11] Patent Number: 5,085,540
[45] Date of Patent: Feb. 4, 1992

[54] ENDMILL WITH NOTCHED SHANK

[75] Inventor: Joseph A. Pagliaccio, Bayville, N.Y.

[73] Assignee: Grumman Aerospace Corporation, Bethpage, N.Y.

[21] Appl. No.: 727,389

[22] Filed: Jul. 5, 1991

Related U.S. Application Data

[63] Continuation of Ser. No. 496,590, Mar. 21, 1990, abandoned.

[51] Int. Cl.⁵ .............................................. B23P 15/28
[52] U.S. Cl. ........................................ 407/11; 407/57
[58] Field of Search ................... 407/110, 57, 59, 56, 407/58

[56] References Cited

U.S. PATENT DOCUMENTS

| | | | |
|---|---|---|---|
| 522,588 | 7/1894 | Chouteau | 407/11 |
| 2,905,059 | 9/1959 | Fabish . | |
| 3,216,107 | 11/1965 | Andreasson . | |
| 3,359,837 | 12/1967 | Andreasson | 407/11 |
| 3,368,257 | 2/1968 | Andreasson | 407/11 |
| 3,947,143 | 3/1976 | Gulla . | |
| 4,274,771 | 6/1981 | Nishimura . | |
| 4,557,643 | 12/1985 | Cioci . | |
| 4,570,952 | 2/1986 | Heimbigner et al. . | |
| 4,705,439 | 11/1987 | Hoyle et al. . | |

FOREIGN PATENT DOCUMENTS

| | | | |
|---|---|---|---|
| 3617540 | 11/1987 | Fed. Rep. of Germany | 407/11 |
| 261651 | 11/1926 | United Kingdom | 407/11 |

OTHER PUBLICATIONS

"Cutting and Grinding Fluids", Tool and Manufacturing Engineers Handbook, Chapter 2, Third Edition, SME, published by McGraw-Hill Book Company.

Primary Examiner—Bruce M. Kisliuk
Assistant Examiner—Lawrence Cruz
Attorney, Agent, or Firm—Pollock, Vande Sande & Priddy

[57] ABSTRACT

The shank of a cutting tool incorporates a longitudinal notch along the outer shank surface. The notch extends from the outer shank end to the relief area of flute zones. The shank is inserted into a coolant-supplying adapter. The coolant is directed from the adapter to the flutes, via the notches. The result is delivery of high pressure lubrication to a work zone. The efficient delivery of lubricant increases machine efficiency by thoroughly flushing the cutter tool with lubricant. In an alternate embodiment, a normal cutting tool may be used with an adapter which has notches formed along the interior diameter surface thereof.

1 Claim, 1 Drawing Sheet

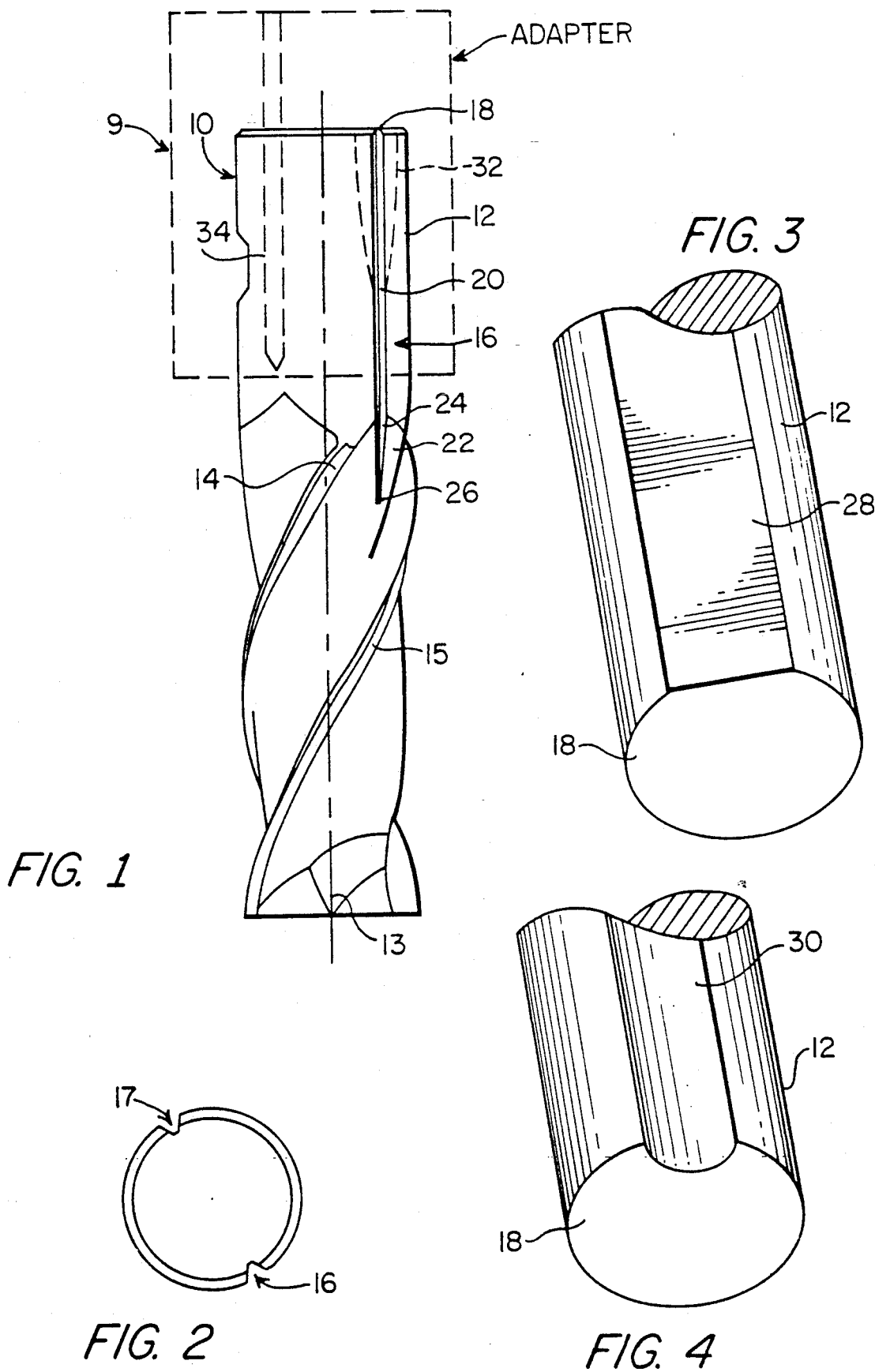

ENDMILL WITH NOTCHED SHANK

This application is a continuation of application Ser. No. 07/496,590, filed on Mar. 21, 1990.

FIELD OF THE INVENTION

The present invention relates to milling tools, and more particularly to such a tool having a notched shank for introducing cooling lubricant into a work area.

BACKGROUND OF THE INVENTION

Cutting fluids are commonly applied during machining to disperse heat from the cutting tool and workpiece. High cutting temperatures decrease tool life, reduce cutting speeds, and reduce the quality of surface finishes. This is a direct result of tool wear, which tests have shown increases exponentially with temperature.

Cutting fluids also lubricate the tool during cutting. The lubrication increases tool life as it allows material to be sheared with less friction. Lubrication can also prevent welding, which can lead to tool or part failure.

Additionally, cutting fluid applied with pressure will remove chips from the cutting zone that can cause friction and reduce cutter life.

Presently, cutting fluids are applied with a pressure pump. Pumping cutting fluid to the cutting zone is usually accomplished with hoses and nozzles. However, this method of spraying has the following drawbacks:

1) it is somewhat unsafe since the operator must stop machine motion and adjust the hoses and flow while the spindle is turning;

2) it causes delays during machining but before and after each tool change while the operator adjusts the hoses for each cutter and moves the hoses away from the tool changer arm;

3) it can be ineffective in many cutting configurations, like slotting, where the coolant is unable to reach the cutter end buried in the material.

However, more modern machines allow cutting fluid to be pumped through the machine spindle and tool adapter. Special tools with through bores are used that enable the fluid to reach the cutting zone. The "through-the-spindle" method has advantages over the hose and nozzle method, such as: good penetration of fluid, high pressure capability that removes chips from the cutting zone, and no hoses to adjust. However, this method requires costly tools that are often difficult to locate; and it cannot be used with small diameter tools. As a result, this type of arrangement can only be used with a limited number of tools.

BRIEF DESCRIPTION OF THE PRESENT INVENTION

In a first embodiment of the present invention, a cutting tool has a shank which incorporates a number of vertical notches located around the circumference of the shank and which extend from the base of the tool to the fluted section. The cutting tool is used in conjunction with a tool holder having a hollow core. Pressurized cutter fluid passes through the hollow core of the tool holder and through the passages created by the notches and the inner diameter surface of the tool holder. The notches are large enough to enable an adequate amount of fluid to flow to the cutter flutes. The notches are indexed around the circumference, allowing for balanced rotation of the tool, and are properly located to force a maximum amount of fluid through the flute cavity to the cutting tool tip.

During operation of the tool, it is cooled and lubricated with the flow of fluid from the notches. The notched cutting tool of the present invention offers a number of distinct advantages including:

1) the ability to use higher machining speeds and obtaining better surface finishes along with longer tool life due to the more effective flushing, cooling and lubrication effects;

2) manufacturing notched tools at lower cost than those having through bores with the attendant additional strength;

3) an increase in worker safety and a reduction of machine idle time due to remote operation as well as the elimination of hose and nozzle adjusting; and 4) the ability to retrofit existing tools with notches, unlike tools having formed through bores.

In a second embodiment of the invention, the cutting tool holder is notched instead of the tool. The advantages of this sort of arrangement are the same as compared with cutting tools having formed through bores.

BRIEF DESCRIPTION OF THE FIGURES

The above-mentioned objects and advantages of the present invention will be more clearly understood when considered in conjunction with the accompanying drawings, in which:

FIG. 1 is an elevational view of a cutting tool fabricated in accordance with the present invention;

FIG. 2 is a top view of the tool, at the shank end, as shown in FIG. 1;

FIG. 3 is a partial perspective view illustrating a flat formed notch for the invention; and FIG. 4 is a partial perspective view illustrating a semicircular notch for the invention.

DETAILED DESCRIPTION OF THE INVENTION

In FIG. 1 an elevational view of a cutting tool is illustrated. In particular, an endmill 10 is shown with its shank 12 inserted within the adapter 9 of a powered machine such as the conventional BOSTOMATIC machine. An endmill adapter is commercially available for this machine and is therefore diagrammatically indicated by dashed lines. The adapter is provided with lubricant which will be transferred across the shank surface of the endmill itself, as will be explained in greater detail hereinafter.

With continued reference to FIG. 1, the illustrated endmill includes dual flutes 14 and 15. An axially central point 13 characterizes the cutting end of the tool. Thus far described, the endmill is completely conventional.

The inventive improvement, in a first embodiment, comprises a plurality of indexed (relatively spaced) elongated notches, generally indicated by reference numerals 16 and 17 in FIGS. 1 and 2. Although two such notches are shown in connection with the endmill of the figures, it is to be understood that additional notches may be furnished. Each notch extends from the outer shank end 18, along the length of the shank section, as indicated by the central section 20 of the notch. Each notch tapers at an inner end 24 which is located in the relief area 22 of the tool. The notch terminates in a point 26 which helps direct lubricant flow into the flutes.

In the embodiment illustrated in FIG. 1, the notch 16 has a generally V-shaped cross section. However, other shapes are possible including a flat notch 28, as shown in FIG. 3, and a semicircular notch 30, such as shown in FIG. 4. Of course, other cross-sectional shapes are possible.

As previously discussed, the adapter 9 (FIG. 1) provides a supply of lubricant. Conventional adapters do this through a hollow core which channels pressurized cutter fluid through passages created by the notches and an inner diameter surface of the tool adapter 9. The notches must be large enough to enable an adequate amount of fluid to flow to the cutter flutes 14 and 15. Indexing of notches around the circumference of the shank 12 allows for a balanced rotation of the tool. They must also be located relative to the relief area 22 so as to force a maximum amount of fluid through each flute cavity to the cutting tool tip.

Although a straight notch has been illustrated in the figures, the notches may also be wedge shaped, such as indicated by dotted line 32 in FIG. 1.

In a second major embodiment of the present invention, the inner diameter wall of the adapter 9 may be provided with a notches such as 34 shown by dotted lines in FIG. 1. Thus, passages are formed between the smooth shank surface of a conventional cutting tool and the notched inner diametrical surface of the adapter. It is through these passages that pressurized cutter fluid flows. This embodiment is attractive because it reduces the cost of notching many cutting tools. In order to maximize the likelihood of aligning the flute cavities and the notches formed in an adapter, a reasonable number of notches should be indexed about the interior surface of the adapter.

By virtue of the invention, notches direct high pressure cutter fluid flow through the flute section for delivery to a cutting tool tip. This will increase machine efficiency by thoroughly flushing the cutting tool with lubricant. Further, since many adapters of the type employed herein have numerical control fluid activation, there is no adjusting of hoses required. Thus, there should be a reduction of machine idle time and reduced operator risk.

It should be understood that the invention is not limited to the exact details of construction shown and described herein for obvious modifications will occur to persons skilled in the art.

I claim:

1. A system for delivering lubrication to a cutting tool surface comprising:
   a cutting tool having a shank section and a flute section;
   a plurality of symmetrically displaced longitudinal notches formed in the surface of the shank section maintaining high speed dynamic balance of the tool;
   each notch extending only between the shank section and a relief area of the flute section;
   an end of each notch, existing at an interface between the notch and the flute section, being tapered for directing fluid flow into the relief area and subsequently into each flute;
   an adapter for holding the shank section and having an interior space communicating with each notch for forcing pressurized lubrication flow from the interior of the adapter through each notch for flushing each flute.

* * * * *